(12) United States Patent
Li et al.

(10) Patent No.: US 11,704,101 B2
(45) Date of Patent: Jul. 18, 2023

(54) FUNCTION-LEVEL REDUNDANCY DETECTION AND OPTIMIZATION

(71) Applicant: Alibaba Group Holding Limited, Grand Cayman (KY)

(72) Inventors: Pengcheng Li, Sunnyvale, CA (US); Shasha Wen, Hangzhou (CN)

(73) Assignee: Alibaba Group Holding Limited

( * ) Notice: Subject to any disclaimer, the term of this patent is extended or adjusted under 35 U.S.C. 154(b) by 457 days.

(21) Appl. No.: 16/920,074

(22) Filed: Jul. 2, 2020

(65) Prior Publication Data

US 2022/0004372 A1 Jan. 6, 2022

(51) Int. Cl.
*G06F 9/44* (2018.01)
*G06F 8/41* (2018.01)
*G06F 8/77* (2018.01)
*G06F 8/33* (2018.01)

(52) U.S. Cl.
CPC .............. *G06F 8/4435* (2013.01); *G06F 8/33* (2013.01); *G06F 8/433* (2013.01); *G06F 8/77* (2013.01)

(58) Field of Classification Search
None
See application file for complete search history.

(56) References Cited

U.S. PATENT DOCUMENTS

| | | | | |
|---|---|---|---|---|
| 2004/0128660 A1* | 7/2004 | Nair | ........... | G06F 8/433 |
| | | | | 717/151 |
| 2007/0174826 A1* | 7/2007 | Guarraci | ............ | G06F 11/366 |
| | | | | 717/136 |
| 2019/0065161 A1* | 2/2019 | Tsirkin | ............ | G06F 8/441 |
| 2021/0232441 A1* | 7/2021 | Lee | ............ | G06F 11/3624 |

* cited by examiner

*Primary Examiner* — Qamrun Nahar
(74) *Attorney, Agent, or Firm* — Lee & Hayes, P.C.

(57) ABSTRACT

The present disclosure provides computer-executable tools which, implemented in a programming language library, may enable source code written using the library to be compiled to object code instrumented for function-level dynamic analysis of memory allocation functions. By tracking heap reads and writes of each target function, symbols may be mapped to memory addresses allocated therefor, and values of input arguments of functions may be mapped to values of output returns. Based on this information, pure functions which embody redundant computations across multiple executions thereof may be identified, while non-pure functions may be screened out. Among pure functions, candidate functions which are executed having the same arguments and returns across multiple executions thereof may be identified, and these functions may be re-compiled to generate object code wherein redundant subsequent executions are avoided, and return values from a first execution thereof are reused across subsequent executions, reducing computational cost.

20 Claims, 5 Drawing Sheets

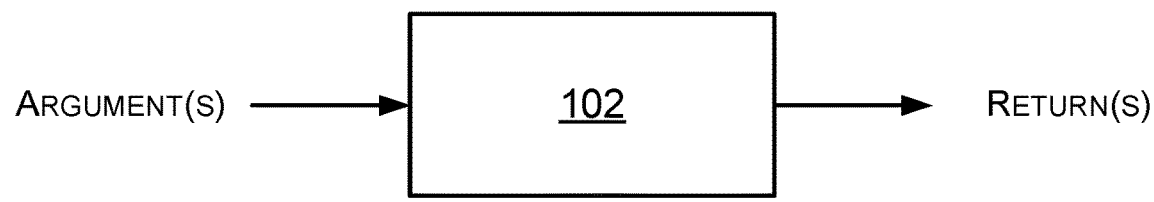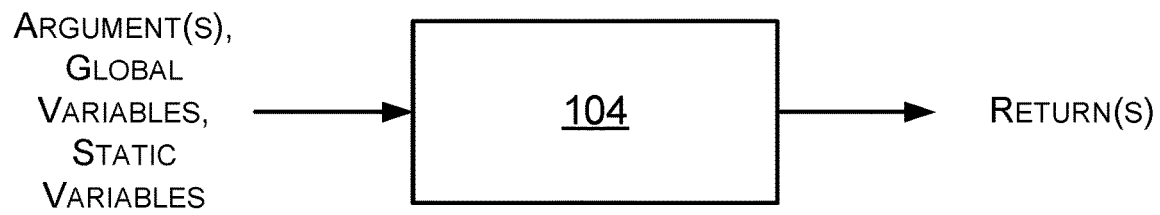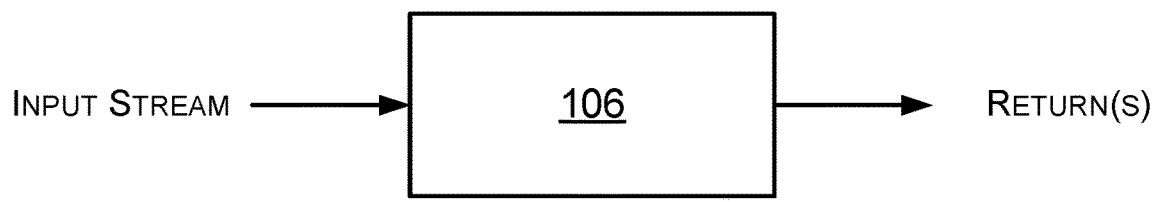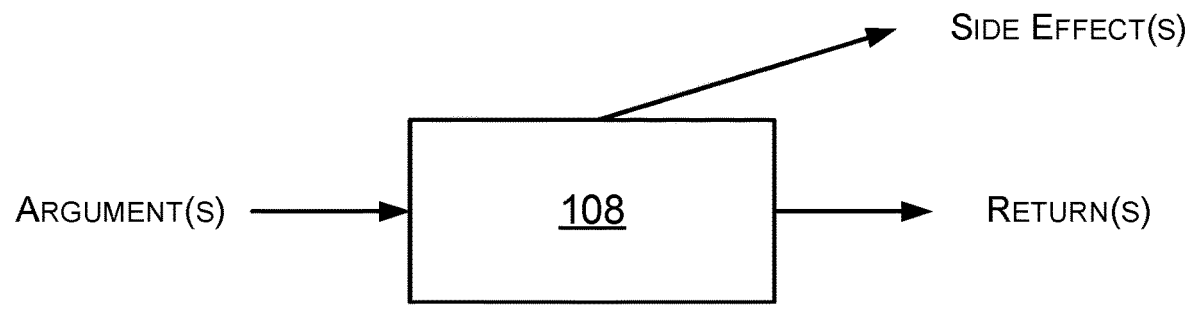
FIG. 1

300

```
┌─────────────────────────────────────────────────────────────────┐
│ COMPILER COMPILES TARGET SOURCE CODE WRITTEN IN PROGRAMMING     │
│ LANGUAGE LIBRARY TO OUTPUT TARGET OBJECT CODE                   │
│ 302                                                             │
└─────────────────────────────────────────────────────────────────┘
                                  ↓
┌─────────────────────────────────────────────────────────────────┐
│ DATA MAPPING SUBMODULE OF INSTRUMENTING MODULE DETERMINES       │
│ REGIONS OF TARGET SOURCE CODE WHEREIN MODULES OF LIBRARY ARE    │
│ LOADED, UNLOADED                                                │
│ 304                                                             │
└─────────────────────────────────────────────────────────────────┘
                                  ↓
┌─────────────────────────────────────────────────────────────────┐
│ DATA MAPPING SUBMODULE READS SYMBOL TABLE GENERATED BY COMPILER │
│ BASED ON TARGET SOURCE CODE                                     │
│ 306                                                             │
└─────────────────────────────────────────────────────────────────┘
                                  ↓
┌─────────────────────────────────────────────────────────────────┐
│ DATA MAPPING SUBMODULE MAPS STATICALLY DECLARED SYMBOLS OF      │
│ TARGET SOURCE CODE TO RANGES OF MEMORY STATICALLY ALLOCATED FOR │
│ THOSE SYMBOLS                                                   │
│ 308                                                             │
└─────────────────────────────────────────────────────────────────┘
                                  ↓
┌─────────────────────────────────────────────────────────────────┐
│ DATA MAPPING SUBMODULE PERFORMS INSTRUMENTATION UPON CALLS TO   │
│ MEMORY ALLOCATION FUNCTIONS IN TARGET SOURCE CODE               │
│ 310                                                             │
└─────────────────────────────────────────────────────────────────┘
                                  ↓
┌─────────────────────────────────────────────────────────────────┐
│ DATA MAPPING SUBMODULE MAPS SYMBOLS CAUSING HEAP ACCESS IN      │
│ TARGET OBJECT CODE TO RANGES OF MEMORY DYNAMICALLY ALLOCATED    │
│ FOR THOSE SYMBOLS                                               │
│ 312                                                             │
└─────────────────────────────────────────────────────────────────┘
                                  ↓
┌─────────────────────────────────────────────────────────────────┐
│ FUNCTION WRAPPING SUBMODULE OF INSTRUMENTING MODULE SCREENS     │
│ POTENTIALLY PURE FUNCTIONS OF TARGET SOURCE CODE FROM NON-PURE  │
│ FUNCTIONS THEREOF                                               │
│ 314                                                             │
└─────────────────────────────────────────────────────────────────┘
                                  ↓
┌─────────────────────────────────────────────────────────────────┐
│ FUNCTION WRAPPING SUBMODULE PERFORMS INSTRUMENTATION UPON EACH  │
│ POTENTIALLY PURE FUNCTION WHICH HAS NOT BEEN SCREENED OUT       │
│ 316                                                             │
└─────────────────────────────────────────────────────────────────┘
                                  ↓
┌─────────────────────────────────────────────────────────────────┐
│ FUNCTION WRAPPING SUBMODULE ENABLES ACCESS MONITORING IN TARGET │
│ OBJECT CODE                                                     │
│ 318                                                             │
└─────────────────────────────────────────────────────────────────┘
                                  ↓
                             To FIG. 3B
```

FROM FIG. 3A

```
FUNCTION WRAPPING SUBMODULE ACQUIRES VALUES OF INPUT PARAMETERS OF A
TARGET FUNCTION PRIOR TO EXECUTION OF TARGET FUNCTION, AND ACQUIRES VALUES
OF OUTPUT RETURNS OF TARGET FUNCTION AFTER EXECUTION OF TARGET FUNCTION
320
```

```
FUNCTION WRAPPING SUBMODULE DETERMINES CANDIDATE FUNCTIONS FOR RETURN
VALUE REUSE
322
```

```
FUNCTION WRAPPING SUBMODULE ADDS EACH TARGET FUNCTION MARKED AS
CANDIDATE FOR RETURN VALUE REUSE TO CANDIDATE FUNCTIONS DATA STRUCTURE
324
```

```
ACCESS MONITORING SUBMODULE ACQUIRES MEMORY ADDRESSES OF EACH READ FROM
HEAP AND WRITE TO HEAP PERFORMED WITHIN INSTRUMENTED CODE; LOOKS UP EACH
WRITTEN-TO MEMORY ADDRESS IN DATA ADDRESS CORRESPONDENCES; IDENTIFIES
EACH SYMBOL IN DATA ADDRESS CORRESPONDENCES MAPPING TO LOOKED-UP MEMORY
ADDRESS; AND ADDS EACH IDENTIFIED SYMBOL, IN THE EVENT THAT IT IS OUTSIDE THE
SCOPE OF TARGET FUNCTION, TO SET OF SYMBOLS OUTSIDE SCOPE OF TARGET
FUNCTION WHICH ARE MAPPED TO WRITES IN HEAP
326
```

```
DATA LOCALITY SUBMODULE OF OPTIMIZING MODULE, FOR EACH CANDIDATE FUNCTION
RECORDED IN CANDIDATE FUNCTIONS DATA STRUCTURE, MAPS ONE OR MORE INPUT
ARGUMENT(S) OF CANDIDATE FUNCTION TO ONE OR MORE OUTPUT RETURN(S) OF
CANDIDATE FUNCTION
328
```

```
REUSE ANALYZING SUBMODULE OF OPTIMIZING MODULE COUNTS FREQUENCY OF EACH
INPUT ARGUMENT(S)-OUTPUT RETURN(S) PAIR, AND DETERMINES WHETHER FREQUENCY
OF EACH INPUT ARGUMENT(S)-OUTPUT RETURN(S) PAIR EXCEEDS THRESHOLD
330
```

```
REUSE ANALYZING SUBMODULE SIGNALS THE COMPILER REGARDING EACH CANDIDATE
FUNCTION WHOSE CORRESPONDING INPUT ARGUMENT(S)-OUTPUT RETURN(S) PAIR
EXCEEDS THRESHOLD OR EXCEEDS PARTICULAR RANK
332
```

FIG. 3B

FUNCTION-LEVEL REDUNDANCY DETECTION AND OPTIMIZATION

BACKGROUND

In programming of computer-readable source code and compilation thereof to generate computer-executable object code, redundancy is a broad concept encompassing a variety of factors which may reduce efficiency in execution of object code, optimization of object code by compilers, and the like. For example, source code may be written using suboptimal data structures or algorithms for performing an operation, causing individual computer-readable instructions of the source code to be redundant with each other. Furthermore, operations may be written which perform computations whose outputs are never used.

Compilers may fail to optimize the conversion of source code into object code under a variety of conditions. For example, common subexpression elimination may be employed to replace expressions in source code with equivalent expressions having lower computational cost. Value numbering may be employed to eliminate expressions which are equivalent to other expressions. Constant propagation may be employed to replace variables with constant values in the event that those variables are determined as having known constant values at compile time.

However, compiler-level optimization of code is generally limited to static analysis of source code as written, which, in turn, limits the scope of redundancies which are visible to the compiler. Code may also be optimized by monitoring code execution in order to identify redundancies, though such optimization generally requires runtime tools. Compilers cannot benefit from information output by such runtime tools, since they operate upon compiled object code; information output by such runtime tools can only be acted upon by programmers, who may revise and re-compiled the source code based on the information.

There is generally a tradeoff between compiler-level optimization tools having capability to detect redundancies in code prior to compilation, with the redundancies being somewhat superficial and limited in scope; and runtime optimization tools having capability to detect redundancies in code in actual execution, but not being able to eliminate those redundancies directly prior to compilation. There is a need for optimization tools to surpass the limitations of these tradeoffs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates a logical diagram of a pure function according to example embodiments of the present disclosure.

FIGS. 3A and 3B illustrate a method of function-level redundancy detection provided by a programming language library according to example embodiments of the present disclosure.

DETAILED DESCRIPTION

Figure 2:
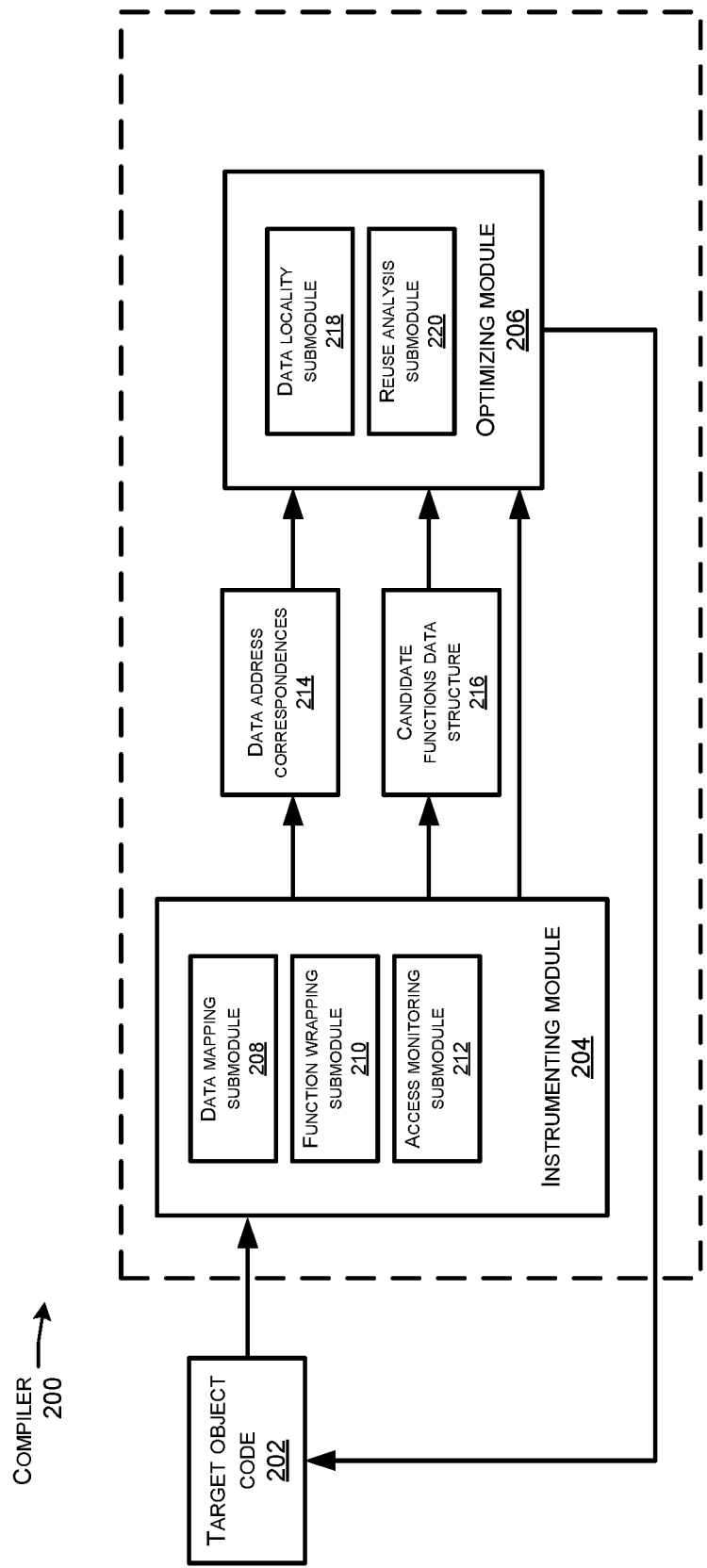
FIG. 2 illustrates a diagram of a compiler implementing a programming language library according to example embodiments of the present disclosure.

Systems and methods discussed herein are directed to implementing function-level redundancy detection, and more specifically implementing a programming language library providing instrumentation and optimization tools operative at the compiler level.

Programming language libraries, in addition to providing definitions of classes, functions and the like for users writing target source code, may further include statically-linked and dynamically-linked code. These libraries may provide functions, routines, objects, variables, and other source code which may be called in source code, the calls being resolved by a compiler during compilation of target source code, and copied into target source code to create linked object code which may be executed by a computer as part of computer-executable target object code (obtained by compiling the target source code). These operations may be performed by components of compilers such as linkers.

While calls to functions, routines, objects, variables and the like often take the form of symbolic references written by users in source code, parts of statically-linked and dynamically-linked libraries may be called without the source code containing references thereto. For example, some functions, routines, variables, and the like may be part of prepared object code, pre-compiled to be linked to target object code and run together with the target object code without being called in the target source code. Such prepared object code may generally be statically defined, being executed independent of functions, routines, objects, variables and such elements of the target source code.

Constructs in source code may be written to tie the execution of linked code to other code; an example of such constructs is a code wrapper. A code wrapper according to example embodiments of the present disclosure may be a block of computer-readable instructions in source code encompassing a call to one or more functions, routines, objects, variables, and the like, the block containing links to other functions and/or routines so as to cause the linked functions and/or routines to be executed alongside the encompassed called functions, routines, objects, variables, and the like. Such blocks need not originate from the source code as originally written; for example, a library may include definitions of code wrappers which may be inserted into source code by a compiler to wrap functions, routines, objects, variables, and the like as called or defined in source code, alongside calls to pre-defined functions and routines.

Code wrappers may be defined for various purposes. For example, code wrappers may serve to encapsulate certain application programming interfaces ("APIs") of libraries in order to hide access from other parts of the program. Code wrappers may also serve to provide runtime access to state and properties of wrapped functions, routines, objects, variables, and the like which are only dynamically generated in object code at runtime and do not exist statically in source code, for other linked functions and/or routines so as to make the wrapped functions, routines, objects, variables, and the like visible to the linked functions and routines (and, conversely, non-visible outside the scope block of the code wrapper).

In source code, individual calls to functions and routines and individual objects and variables have their visibility to other functions, routines, and the like defined by their scope.

Scope of calls to a function, routine, object, variable and the like may be limited to a region of source code such as a block making up contiguous lines of source code. Thus, encapsulating such a block within a code wrapper may extend scope of all called functions, routines, objects, variables and the like to the entire block encompassed by the code wrapper, such that visibility of functions, routines, objects, variables and the like therein may be extended to additional linked functions, routines and the like of the code wrapper.

According to example embodiments of the present disclosure, a programming language library may provide one or more computer-executable tool(s) linkable to one or more particular function call(s) in target source code such that, after compilation of the target source code to obtain target object code the computer-executable tool(s) may be executed within the same scope of executing the function call(s) at runtime of the target object code. The linked computer-executable tool(s), by such execution, may access scope of the function call(s) and thus determine runtime state and/or properties of those function call(s). According to example embodiments of the present disclosure, the programming language library may provide one or more code wrapper(s) operative to wrap the particular function calls so as to link execution of the one or more computer-executable tool(s) to execution of the function call(s) and to make scope of the function call(s) visible to the one or more computer-executable tool(s).

According to example embodiments of the present disclosure, a compiler may provide a linker operative to link the one or more computer-executable tool(s) to one or more particular function call(s) in target source code. The linker may be operative to search the target source code for one or more call(s) to one or more particular function(s), to identify any scope blocks containing the call(s), to wrap the call(s) in one or more code wrapper(s), and to create links to one or more computer-executable tool(s) in the code wrapper(s).

According to example embodiments of the present disclosure, linked computer-executable tools may be provided by the library as pre-written source code which may be compiled by the compiler alongside the target source code. Alternatively, linked computer-executable tools may be provided by the library as pre-compiled object code which may be executed by links to the execution of the function call(s).

The linked computer-executable tools may be, for example, instrumentation tools, which may operate by the linker inserting calls to pre-defined functions before and/or after particular function call(s) in target source code. The insertion of such calls may enable the pre-defined functions to be run during execution of the target object code, so as to determine certain states and properties of functions, routines, objects, variables, and the like as defined in the target source code, as they may be dynamically generated in memory of the executed object code at the time that the inserted calls are executed.

By such operations, the linked computer-executable tools may be executed to perform profiling functions upon the target object code. Profiling functions may include dynamically analyzing aspects of the target object code during execution thereof, including memory space of the target object code; executions of particular instructions of an instruction set architecture ("ISA") of a computer architecture which the target object code has been compiled to run on; calls to particular functions; and the like. Such aspects of the target object code during execution thereof generally do not exist statically in the target source code as written.

By such techniques, linked computer-executable tools according to example embodiments of the present disclosure include a redundant computation detection tool. A redundant computation detection tool may be executable to determine subsequent executions of particular functions called in target source code which are redundant to a first execution of the particular function called in the target source code, as described below.

While "redundancy" may have various meanings in the context of computation, according to example embodiments of the present disclosure, redundancy may refer to function calls of the target source code which cause a particular function to be executed multiple times with arguments and returns of the particular function being the same each execution, the function calls having no side effects (which shall be described in further detail subsequently). Under such conditions, any subsequent executions of the particular function after the first execution thereof may be considered redundant, since return(s) being the same for each execution, and there being no side effects for each execution (which shall be described in further detail subsequently), would mean that, for each subsequent execution of the redundant calls to the particular function, any portions of the source code and object code dependent upon these calls would not execute differently. However, conversely, if any subsequent executions of the particular function after the first execution thereof has any different return(s) despite having the same arguments, or executions of the particular function have side effects, the subsequent executions could not be considered redundant.

Thus, according to example embodiments of the present disclosure, it is desired to avoid subsequent executions of a particular function which are redundant to a first execution thereof, but proceed with subsequent executions of a particular function which are not redundant to any other executions thereof. According to example embodiments of the present disclosure, this may be accomplished by return value reuse, as shall be described in further detail below.

Furthermore, linked computer-executable tools according to example embodiments of the present disclosure include an optimization tool. An optimization tool may be executable to cause a compiler to replace redundant subsequent executions of a particular function, as described above, with a reference to one or more return value(s). The one or more return value(s) may be, for example, return value(s) computed from a first execution of the particular function.

Aspects of programming language libraries and computer-executable tools according to example embodiments of the present disclosure shall be described in further detail with reference to the subsequent methods, systems, and/or apparatuses.

FIG. 1 illustrates a logical diagram of a pure function according to example embodiments of the present disclosure.

In computer science, a pure function may refer to a function satisfying at least two conditions: a pure function outputs the same return values for the same arguments input into the function, and execution of a pure function has no side effects.

In contrast, non-pure functions may fail to satisfy either, or both, of the above conditions based on factors other than input arguments. For example, non-pure functions may fail to satisfy either or both of the above conditions depending on values of static variables within the scope of the function (i.e., such values being input as arguments or being impacted as side effects). Or, non-pure functions may fail to satisfy either or both of the above conditions depending on values of variables outside the scope of the function (i.e., such values being input as arguments or being impacted as side effects). Or, non-pure functions may fail to satisfy either or both of the above conditions depending on the input arguments being variable, such as input arguments being mutable, references, streams, and the like.

Thus, the pure function 102 as illustrated satisfies both conditions; the non-pure function 104 as illustrated fails to satisfy the first condition due to having more dependencies than the input arguments; the non-pure function 106 as illustrated fails to satisfy the first condition due to having variable input arguments; and the non-pure function 108 as illustrated fails to satisfy the second condition due to having side effects.

Examples of pure functions may include, for example, functions performing mathematical operations. Various programming language libraries may include math libraries which implement various common mathematical operations such as division functions, modulus functions, square functions, square root functions, power functions, sine, cosine, and tangent functions and functions related thereto, ceiling and floor functions, absolute value functions, logarithm functions, and the like. Generally, such functions, upon receiving the same arguments as input, will always return the same value or values as output.

Thus, according to example embodiments of the present disclosure, after a pure function has been executed once with one or more particular argument(s) as input, where, furthermore, each subsequent call to the same pure function has the same particular argument(s) as input, based on the nature of the function as a pure function, it may be anticipated that the function will return a same value as output, and it is desirable to avoid executing the function additional times beyond the first execution thereof. This may be accomplished through return value reuse, as shall be described in more detail below.

FIG. 2 illustrates a diagram of a compiler 200 implementing a programming language library according to example embodiments of the present disclosure.

According to example embodiments of the present disclosure, a programming language library may be implemented for any existing or novel programming language implementing dynamic memory allocation. That is, the programming language implements memory allocation functions callable in source code which may access a pool of memory space, such as a heap; may allocate a block of memory space for further operations; may initialize values within an allocated block of memory space; may change the size of allocated blocks of memory space; and may release allocated blocks of memory space for subsequent allocations. As such blocks of memory space may only be allocated at runtime, contents of blocks of memory space allocated and written to in such fashions may only be determined at runtime and may not be determined statically.

For example, a programming language implementing dynamic memory allocation may be C or C++. Examples of the above-mentioned memory allocation functions as implemented in C and C++ may be, for example, malloc( ), calloc( ), realloc( ), and free( ), respectively. Within functions written in source code according to example embodiments of the present disclosure, calls to such memory allocation functions may be made in order to provide, manage, and release memory space required for operations defined in the functions.

According to example embodiments of the present disclosure, linked computer-executable tools provided by a library may be wrapped around calls to such memory allocation functions so as to profile contents of allocated blocks of memory space as the blocks are initialized and written to. Each function which calls such memory allocation functions may be targeted to determine, based on contents of the blocks of memory space, whether each target function is a pure function or not, and, furthermore, whether each such pure function is a candidate for return value reuse or not. By such memory profiling, the linked computer-executable tools may mark target functions as candidates for return value reuse according to example embodiments of the present disclosure.

According to example embodiments of the present disclosure, optimization tools may track frequency of execution of candidate target functions and determine whether they meet thresholds for return value reuse, as shall be described in further detail below.

A compiler 200 according to example embodiments of the present disclosure may compile target source code (not illustrated) written in a programming language library according to example embodiments of the present disclosure, to output target object code 202. The target source code may include links to modules of the programming language library which provide computer-executable tools, including an instrumenting module 204 and an optimizing module 206. The instrumenting module 204 and the optimizing module 206, and submodules thereof, may act upon the target object code 202 during one or more stages of compilation, and/or may be linked to execution of the target object code 202, in the following manners.

For each function of the target source code (each referred to henceforth individually as a "target function"), a data mapping submodule 208, a function wrapping submodule 210, and an access monitoring submodule 212 of the instrumenting module 204 may each act upon the target function during one or more stages of compilation and/or execute in a manner linked to the target function at runtime.

According to example embodiments of the present disclosure, the data mapping submodule 208 may perform static analysis upon the target source code as well as perform instrumentation upon the target source code and/or the target object code 202 so as to insert instrumentation source code and/or instrumentation object code operative to perform dynamic analysis upon heap access by the target object code 202 at runtime.

The data mapping submodule 208 may perform static analysis upon the target source code during one or more stages of compilation to determine regions of the target source code wherein modules of the programming language library (which should not be conflated with modules and submodules of the compiler 200) are loaded and are unloaded.

The data mapping submodule 208 may perform static analysis upon the target source code during one or more stages of compilation to read a symbol table generated by the compiler 200 based on the target source code. A symbol table may generally refer to a data structure (which may or may not be a table) generated by a compiler during compilation, which refers to each symbol (i.e., a name) in the source code, where it is declared, and where it appears after declaration.

The data mapping submodule 208 may perform static analysis upon the target source code during one or more stages of compilation to map statically declared symbols (such as variables or objects) to ranges of memory which may be statically allocated for those symbols. Such mappings may be recorded in a data structure such as trees, lists, tuples, tables, hash mappings, and any other such suitable data structure for mapping pairs of information. For the purpose of example embodiments of the present disclosure, such a data structure may be referred to as "data address correspondences" (illustrated in FIG. 2 as data address correspondences 214), though the data address correspondences need not be a table and may be any suitable data structure as described above.

Furthermore, the data mapping submodule 208 may enable the performance of dynamic analysis upon the target object code 202 during runtime by performing instrumentation upon calls to memory allocation functions during one or more stages of compilation. Such instrumentation may introduce code blocks encompassing, or replacing, the calls to memory allocation functions. Such instrumentation may provide links to further computer-executable tools such as the function wrapping submodule 210 and the access monitoring submodule 212, so as to enable those submodules to profile heap access by target functions, as described in further detail below.

Furthermore, the data mapping submodule 208 may perform dynamic analysis upon the target object code 202 during runtime to map symbols causing heap access in the target object code, such as objects initialized by calls to memory allocation functions, to ranges of memory which may be dynamically allocated therein. Such mappings may be recorded in a data structure such as data address correspondences 214 as described above.

The function wrapping submodule 210 may perform static analysis upon the target source code during one or more stages of compilation to screen potentially pure functions from non-pure functions. The screening criteria may include, for example, according to FIG. 1 as described above: for each target function, references to symbols outside the scope of the target function, such as in the input arguments or in the body of the function, as well as references to statically declared symbols (which may be determined by reference to the symbol table), may indicate that the function is non-pure and should be screened out.

The function wrapping submodule 210 may enable the performance of dynamic analysis upon the target object code during runtime by performing instrumentation upon each potentially pure function which has not been screened out as described above. Instrumentation may include encompassing the function in a code wrapper, which may provide links to the function wrapping submodule 210 to enable dynamic analysis functions as shall be described below.

The function wrapping submodule 210 may perform dynamic analysis upon the target object code 202 during runtime to enable access monitoring, such as by enabling flags provided by the programming language library which enable monitoring reads and writes to heap memory allocated by the target object code. Access monitoring may be enabled in the control flow of the target object code 202 before execution of each instrumented target function, and may be disabled in the control flow of the target object code 202 after execution of each instrumented target function completes. Access monitoring may be performed by the access monitoring submodule 212 at runtime as shall be described below.

The function wrapping submodule 210 may perform dynamic analysis upon the target object code 202 during runtime to acquire values of input parameters of a target function (from dynamically allocated memory) prior to execution of the target function, and to acquire values of output returns of the target function (from dynamically allocated memory) after execution of the target function. Being able to compare values of input parameters and output parameters between individual executions of the target function may enable target functions to be identified as pure functions based on criteria according to FIG. 1 as described above. In the event that multiple executions of the target function have the same input parameter values but different output parameter values, the target function may be determined as not a pure function, and thus rejected as a candidate for return value reuse.

Furthermore, in the event that multiple executions of the target function do not have the same input parameter values, regardless of whether the target function is a pure function, the target function may be rejected as a candidate for return value reuse.

The function wrapping submodule 210 may perform dynamic analysis upon the target object code 202 during runtime to evaluate access monitoring results by the access monitoring submodule 212. For example, symbols mapped to writes to heap (as shall be described in more detail below) may be evaluated to determine whether these symbols are outside the scope of the target function (for example, in accordance with the symbol table). If the set of symbols outside the scope of the target function which are mapped to writes to heap in the data address correspondences 214, as determined from access monitoring results, is null, and in the event that the target function has not been rejected as a candidate based on other criteria as described above, the target function may be marked as a candidate for return value reuse. However, upon any execution of a target function which has been marked as a candidate, wherein the set of symbols outside the scope of the target function which are mapped to writes to heap in the data address correspondences 214 is not null, the target function may be rejected as a candidate.

The function wrapping submodule 210 may add each target function marked as a candidate for return value reuse to a candidate functions data structure 216. The candidate functions data structure 216 may be any data structure suitable for storing some number of unordered elements. Target functions rejected as candidates may not be reconsidered as candidates within the processing of a target source code by the compiler 200, according to example embodiments of the present disclosure.

The access monitoring submodule 212 may perform dynamic analysis upon the target object code 202 during runtime by the instrumentation performed by the function wrapping submodule 210 as described above, to acquire memory addresses of each read from heap and write to heap performed within the instrumented code; look up each written-to memory address in the data address correspondences 214; identify each symbol in the data address correspondences 214 mapping to a looked-up memory address; and adding each identified symbol, in the event that it is outside the scope of the target function (for example, in accordance with the symbol table), to a set of symbols outside the scope of the target function which are mapped to writes in heap (as described above with reference to the function wrapping submodule 210). Thus, the access monitoring submodule 212 may support operations of the function wrapping submodule 210.

For each target function of the target source code, a data locality submodule 218 and a reuse analyzing submodule 220 of the optimizing module 206 may each act upon the target function after runtime of the target object code 202. Results derived by the optimizing module 206 and submodules thereof may be utilized in re-compiling the target object code 202 to implement return value reuse on candidate functions recorded in the candidate functions data structure 216.

According to example embodiments of the present disclosure, the data locality submodule 218 may, for each candidate function recorded in the candidate functions data structure 216, map one or more input argument(s) of the candidate function to one or more output return(s) of the candidate function.

According to example embodiments of the present disclosure, the reuse analyzing submodule 220 of the optimizing module 206 may count frequency of each input argument(s)-output return(s) pair (for example, based on symbols written to heap in the data address correspondences 214), and determine whether frequency of each input argument(s)-output return(s) pair exceeds a threshold. The reuse analyzing submodule 220 may further rank input argument(s)-output return(s) pairs in order of frequency. Thresholds may be arbitrarily set or experimentally determined in order to control the extent to which return value reuse is implemented upon source code in general; lower thresholds may cause return value reuse to be applied to more functions in source code, decreasing computation in executing object code compiled from the source code. However, overly low thresholds may lead to diminished returns in saving computation, and may lead to increased overhead in instrumentation activities performed by the compiler 200.

Subsequently, the reuse analyzing submodule 220 may signal the compiler 200 regarding each candidate function whose corresponding input argument(s)-output return(s) pair exceeds a threshold or exceeds a particular rank. The compiler 200 may re-compile the target source code, modifying the candidate functions by instrumentation, replacement of code, or other suitable methods to replace calls to the candidate functions (subsequent to a first call thereto) by references to the memory addresses corresponding to the input argument(s)-output return(s) pair. The compiler may further instrument the memory allocation functions corresponding to the candidate function so that the values of the memory addresses may be preserved across executions of the candidate function, rather than released in between executions, enabling return values of a first execution of the candidate function to be reused across subsequent executions of the candidate function.

FIGS. 3A and 3B illustrate a method 300 of function-level redundancy detection provided by a programming language library according to example embodiments of the present disclosure.

At a step 302, a compiler compiles target source code written in a programming language library to output target object code. The target source code may include links to modules of the programming language library which provide computer-executable tools, including an instrumenting module and an optimizing module. The instrumenting module and the optimizing module, and submodules thereof, may act upon the target object code during one or more stages of compilation, and/or may be linked to execution of the target object code, in the following steps.

In steps 304, 306, 308, 310, and 312, a data mapping submodule of the instrumenting module performs static analysis upon the target source code as well as performs instrumentation upon the target source code and/or the target object code so as to insert instrumentation source code and/or instrumentation object code operative to perform dynamic analysis upon heap access by the target object code at runtime.

At a step 304, a data mapping submodule of the instrumenting module determines regions of the target source code wherein modules of the programming language library are loaded and are unloaded. This step may constitute static analysis performed upon the target source code during one or more stages of compilation.

At a step 306, the data mapping submodule reads a symbol table generated by the compiler based on the target source code. This step may constitute static analysis performed upon the target source code during one or more stages of compilation.

At a step 308, the data mapping submodule maps statically declared symbols of the target source code to ranges of memory statically allocated for those symbols. Such mappings may be recorded in a data structure such as trees, lists, tuples, tables, hash mappings, and any other such suitable data structure for mapping pairs of information. Such a data structure may be referred to as "data address correspondences" as described above, which may be any suitable data structure as described above. This step may constitute static analysis performed upon the target source code during one or more stages of compilation.

At a step 310, the data mapping submodule performs instrumentation upon calls to memory allocation functions in the target source code. Such instrumentation may be performed during one or more stages of compilation, and may enable the performance of dynamic analysis upon the target object code during runtime. Such instrumentation may introduce code blocks encompassing, or replacing, the calls to memory allocation functions. Such instrumentation may provide links to further computer-executable tools such as a function wrapping submodule and an access monitoring submodule of the instrumenting module, so as to enable those submodules to profile heap access by target functions, as described in subsequent steps below.

At a step 312, the data mapping submodule maps symbols causing heap access in the target object code to ranges of memory dynamically allocated for those symbols. For example, symbols may be objects initialized by calls to memory allocation functions. This step may constitute dynamic analysis performed upon the target object code during runtime. Such mappings may be recorded in a data structure such as data address correspondences as described above.

At a step 314, a function wrapping submodule of the instrumenting module screens potentially pure functions of the target source code from non-pure functions thereof. This step may constitute static analysis performed upon the target source code during one or more stages of compilation. The screening criteria may include, for example, according to FIG. 1 as described above: for each target function, references to symbols outside the scope of the target function, such as in the input arguments or in the body of the function, as well as references to statically declared symbols (which may be determined by reference to the symbol table), may indicate that the function is non-pure and should be screened out.

At a step 316, the function wrapping submodule performs instrumentation upon each potentially pure function which has not been screened out. Such instrumentation may enable the performance of dynamic analysis upon the target object code during runtime. Instrumentation may include encompassing the function in a code wrapper, which may provide links to the function wrapping submodule to enable dynamic analysis functions.

At a step 318, the function wrapping submodule enables access monitoring in the target object code. This step may constitute performing dynamic analysis upon the target object code during runtime. For example, the function wrapping submodule may enable flags provided by the programming language library which enable monitoring reads and writes to heap memory allocated by the target object code. Access monitoring may be enabled in the control flow of the target object code before execution of each instrumented target function, and may be disabled in the control flow of the target object code after execution of each instrumented target function completes. Access monitoring may be performed by the access monitoring submodule at runtime.

At a step 320, the function wrapping submodule acquires values of input parameters of a target function prior to execution of the target function, and acquires values of output returns of the target function after execution of the target function. This step may constitute dynamic analysis performed upon the target object code during runtime. Being able to compare values of input parameters and output parameters between individual executions of the target function may enable target functions to be identified as pure functions based on criteria according to FIG. 1 as described above. In the event that multiple executions of the target function have the same input parameter values but different output parameter values, the target function may be determined as not a pure function, and thus rejected as a candidate for return value reuse.

Furthermore, in the event that multiple executions of the target function do not have the same input parameter values, regardless of whether the target function is a pure function, the target function may be rejected as a candidate for return value reuse.

At a step 322, the function wrapping submodule determines candidate functions for return value reuse. This may be performed by evaluating access monitoring results by an access monitoring submodule of the instrumenting module. This step may constitute dynamic analysis performed upon the target object code during runtime. For example, symbols mapped to writes to heap may be evaluated to determine whether these symbols are outside the scope of the target function. If the set of symbols outside the scope of the target function which are mapped to writes to heap in the data address correspondences, as determined from access monitoring results, is null, and in the event that the target function has not been rejected as a candidate based on other criteria as described above, the target function may be marked as a candidate for return value reuse. However, upon any execution of a target function which has been marked as a candidate, wherein the set of symbols outside the scope of the target function which are mapped to writes to heap in the data address correspondences is not null, the target function may be rejected as a candidate.

At a step 324, the function wrapping submodule adds each target function marked as a candidate for return value reuse to a candidate functions data structure. The candidate functions data structure may be any data structure suitable for storing some number of unordered elements. Target functions rejected as candidates may not be reconsidered as candidates within the processing of a target source code by the compiler, according to example embodiments of the present disclosure.

At a step 326, the access monitoring submodule acquires memory addresses of each read from heap and write to heap performed within the instrumented code; looks up each written-to memory address in the data address correspondences; identifies each symbol in the data address correspondences mapping to a looked-up memory address; and adds each identified symbol, in the event that it is outside the scope of the target function, to a set of symbols outside the scope of the target function which are mapped to writes in heap. This step may constitute dynamic analysis performed upon the target object code during runtime by the instrumentation performed by the function wrapping submodule. Thus, the access monitoring submodule may support operations of the function wrapping submodule.

In steps 328 and 330, for each target function of the target source code, a data locality submodule and a reuse analyzing submodule of the optimizing module each acts upon the target function after runtime of the target object code. Results derived by the optimizing module and submodules thereof may be utilized in re-compiling the target object code to implement return value reuse on candidate functions recorded in the candidate functions data structure.

At a step 328, a data locality submodule of the optimizing module, for each candidate function recorded in the candidate functions data structure, maps one or more input argument(s) of the candidate function to one or more output return(s) of the candidate function.

At a step 330, a reuse analyzing submodule of the optimizing module counts frequency of each input argument(s)-output return(s) pair, and determines whether frequency of each input argument(s)-output return(s) pair exceeds a threshold. The reuse analyzing submodule may further rank input argument(s)-output return(s) pairs in order of frequency.

At a step 332, the reuse analyzing submodule signals the compiler regarding each candidate function whose corresponding input argument(s)-output return(s) pair exceeds a threshold or exceeds a particular rank. The compiler may re-compile the target source code, modifying the candidate functions by instrumentation, replacement of code, or other suitable methods to replace calls to the candidate functions (subsequent to a first call thereto) by references to the memory addresses corresponding to the input argument(s)-output return(s) pair. The compiler may further instrument the memory allocation functions corresponding to the candidate function so that the values of the memory addresses may be preserved across executions of the candidate function, rather than released in between executions, enabling return values of a first execution of the candidate function to be reused across subsequent executions of the candidate function.

Figure 4:
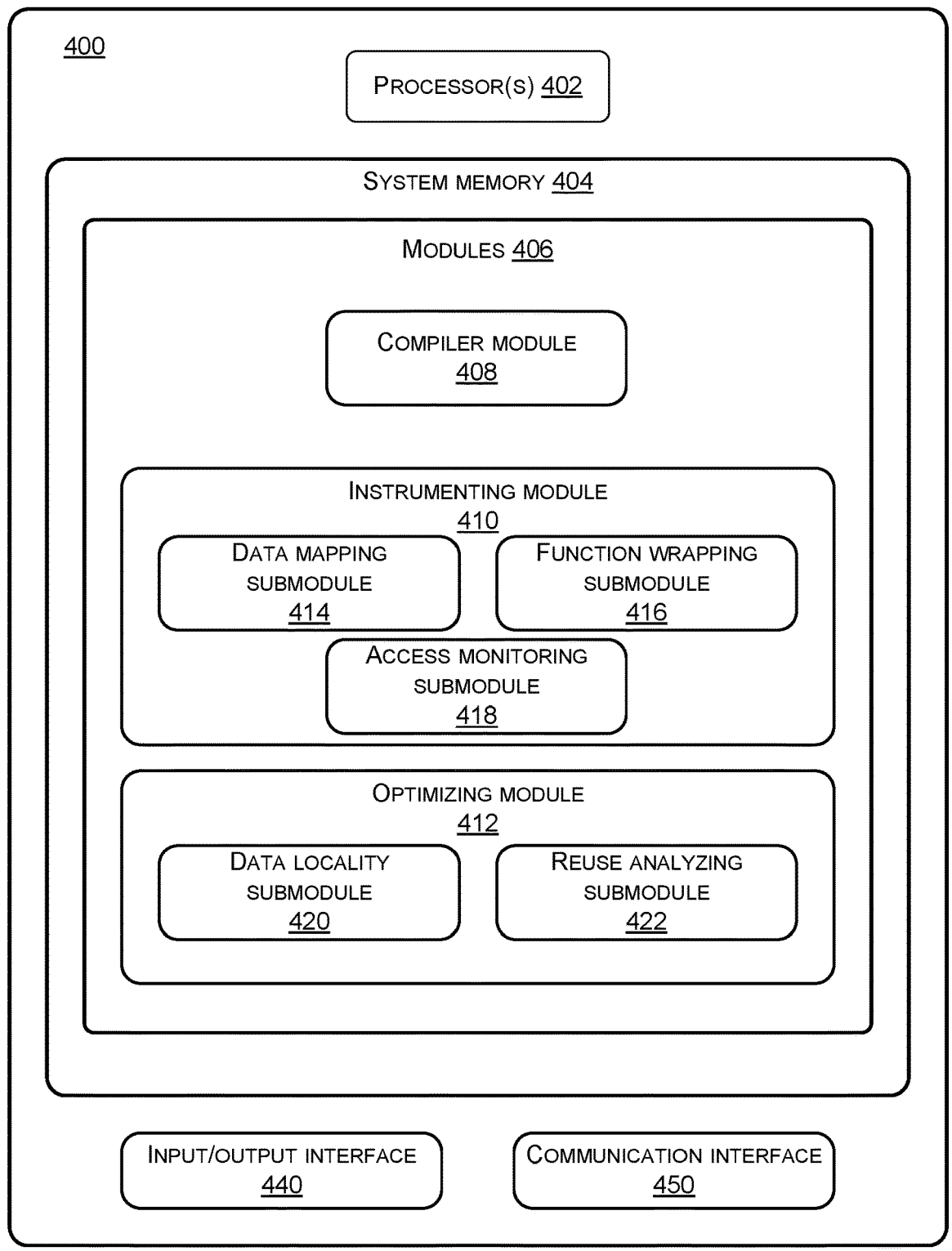
FIG. 4 illustrates an example computing system for implementing the processes and methods described above for implementing a programming language library providing computer-executable tools including instrumentation and optimization tools.

FIG. 4 illustrates an example computing system 400 for implementing the processes and methods described above for implementing a programming language library providing computer-executable tools including instrumentation and optimization tools.

The techniques and mechanisms described herein may be implemented by multiple instances of the computing system 400, as well as by any other computing device, system, and/or environment. The computing system 400, as described above, may be any varieties of computing devices, such as personal computers, personal tablets, mobile devices, other such computing devices operative to perform compilation of source code and dynamic memory allocations. The system 400 shown in FIG. 4 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 400 may include one or more processors 402 and system memory 404 communicatively coupled to the processor(s) 402. The processor(s) 402 and system memory 404 may be physical or may be virtualized and/or distributed. The processor(s) 402 may execute one or more modules and/or processes to cause the processor(s) 402 to perform a variety of functions. In embodiments, the processor(s) 402 may include a central processing unit ("CPU"), a graphics processing unit ("GPU"), any combinations thereof, or other processing units or components known in the art. Additionally, each of the processor(s) 402 may possess its own local memory, which also may store program modules, program data, and/or one or more operating systems.

Depending on the exact configuration and type of the system 400, the system memory 404 may be volatile, such as RAM, non-volatile, such as ROM, flash memory, miniature hard drive, memory card, and the like, or some combination thereof. The system memory 404 may include one or more computer-executable modules 406 that are executable by the processor(s) 402.

The modules 406 may include, but are not limited to, a compiler module 408, an instrumenting module 410, and an optimizing module 412. The instrumenting module 410 may further include a data mapping submodule 414, a function wrapping submodule 416, and an access monitoring submodule 418. The optimizing module 412 may further include a data locality submodule 420 and a reuse analyzing submodule 422.

The compiler module 408 may be configured to perform functions of a compiler 200 as described above.

The instrumenting module 410 may be configured to perform functions of an instrumenting module 204 as described above.

The optimizing module 412 may be configured to perform functions of an optimizing module 206 as described above.

The data mapping submodule 414 may be configured to perform functions of a data mapping submodule 208 as described above.

The function wrapping submodule 416 may be configured to perform functions of a function wrapping submodule 210 as described above.

The access monitoring submodule 418 may be configured to perform functions of an access monitoring submodule 212 as described above.

The data locality submodule 420 may be configured to perform functions of a data locality submodule 218 as described above.

The reuse analyzing submodule 422 may be configured to perform functions of a reuse analyzing submodule 220 as described above.

The system 400 may additionally include an input/output ("I/O") interface 440 and a communication module 450 allowing the system 400 to communicate with other systems and devices over a network. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, example embodiments of the present disclosure provide computer-executable tools which, implemented in a programming language library, may enable source code written using the library to be compiled to object code instrumented for function-level dynamic analysis of memory allocation functions. By tracking heap reads and writes of each target function, symbols may be mapped to memory addresses allocated therefor, and values of input arguments of functions may be mapped to values of output returns. Based on this information, pure functions which embody redundant computations across multiple executions thereof may be identified, while non-pure functions may be screened out. Among pure functions, candidate functions which are executed having the same arguments and returns across multiple executions thereof may be identified, and these functions may be re-compiled to generate object code wherein redundant subsequent executions are avoided, and return values from a first execution thereof are reused across subsequent executions, reducing computational cost.

Example Clauses

A. A method comprising: compiling target source code written in a programming language library to output target object code; performing instrumentation upon calls to memory allocation functions in the target source code; and mapping symbols causing heap access in the target object code to ranges of memory dynamically allocated for those symbols.

B. The method as paragraph A recites, further comprising screening potentially pure functions of the target object code from non-pure functions thereof; and performing instrumentation upon each potentially pure function which has not been screened out.

C. The method as paragraph A recites, further comprising acquiring values of input parameters of a target function prior to execution of the target function; acquiring values of output returns of the target function after execution of the target function; determining candidate functions for return value reuse; and adding each target function marked as a candidate for return value reuse to a candidate functions data structure.

D. The method as paragraph A recites, further comprising acquiring memory addresses of each read from heap and write to heap performed within the instrumented code; looking up each written-to memory address in the data address correspondences; identifying each symbol in the data address correspondences mapping to a looked-up memory address; and adding each identified symbol, in the event that it is outside the scope of the target function, to a set of symbols outside the scope of the target function which are mapped to writes in heap.

E. The method as paragraph A recites, further comprising for each candidate function recorded in the candidate functions data structure, mapping one or more input argument(s) of the candidate function to one or more output return(s) of the candidate function.

F. The method as paragraph E recites, further comprising counting frequency of each input argument(s)-output return(s) pair; and determining whether frequency of each input argument(s)-output return(s) pair exceeds a threshold.

G. The method as paragraph F recites, further comprising signaling a compiler regarding each candidate function whose corresponding input argument(s)-output return(s) pair exceeds a threshold or exceeds a particular rank.

H. A system comprising: one or more processors; and memory communicatively coupled to the one or more processors, the memory storing computer-executable modules executable by the one or more processors that, when executed by the one or more processors, perform associated operations, the computer-executable modules comprising: a compiler module configured to compile target source code written in a programming language library to output target object code; and an instrumenting module further comprising a data mapping submodule configured to: perform instrumentation upon calls to memory allocation functions in the target source code; and map symbols causing heap access in the target object code to ranges of memory dynamically allocated for those symbols.

I. The system as paragraph H recites, wherein the data mapping submodule is further configured to: screen potentially pure functions of the target object code from non-pure functions thereof; and perform instrumentation upon each potentially pure function which has not been screened out.

J. The system as paragraph H recites, wherein the instrumenting module further comprises a function wrapping submodule configured to: acquire values of input parameters of a target function prior to execution of the target function; acquire values of output returns of the target function after execution of the target function; determine candidate functions for return value reuse; and add each target function marked as a candidate for return value reuse to a candidate functions data structure.

K. The system as paragraph H recites, wherein the instrumenting module further comprises an access monitoring submodule configured to: acquire memory addresses of each read from heap and write to heap performed within the instrumented code; look up each written-to memory address in the data address correspondences; identify each symbol in the data address correspondences mapping to a looked-up memory address; and add each identified symbol, in the event that it is outside the scope of the target function, to a set of symbols outside the scope of the target function which are mapped to writes in heap.

L. The system as paragraph H recites, further comprising an optimizing module, the optimizing module further comprising a data locality submodule configured to, for each candidate function recorded in the candidate functions data structure, map one or more input argument(s) of the candidate function to one or more output return(s) of the candidate function.

M. The system as paragraph L recites, wherein the optimizing module further comprises a reuse analyzing submodule configured to: count frequency of each input argument(s)-output return(s) pair; and determine whether frequency of each input argument(s)-output return(s) pair exceeds a threshold.

N. The system as paragraph M recites, wherein the reuse analyzing submodule is further configured to signal a compiler regarding each candidate function whose corresponding input argument(s)-output return(s) pair exceeds a threshold or exceeds a particular rank.

O. A computer-readable storage medium storing computer-readable instructions executable by one or more processors, that when executed by the one or more processors, cause the one or more processors to perform operations comprising: compiling target source code written in a programming language library to output target object code; performing instrumentation upon calls to memory allocation functions in the target source code; and mapping symbols causing heap access in the target object code to ranges of memory dynamically allocated for those symbols.

P. The computer-readable storage medium as paragraph O recites, wherein the operations further comprise: screening potentially pure functions of the target object code from non-pure functions thereof; and performing instrumentation upon each potentially pure function which has not been screened out.

Q. The computer-readable storage medium as paragraph O recites, wherein the operations further comprise: acquiring values of input parameters of a target function prior to execution of the target function; acquiring values of output returns of the target function after execution of the target function; determining candidate functions for return value reuse; and adding each target function marked as a candidate for return value reuse to a candidate functions data structure.

R. The computer-readable storage medium as paragraph O recites, wherein the operations further comprise: acquiring memory addresses of each read from heap and write to heap performed within the instrumented code; looking up each written-to memory address in the data address correspondences; identifying each symbol in the data address correspondences mapping to a looked-up memory address; and adding each identified symbol, in the event that it is outside the scope of the target function, to a set of symbols outside the scope of the target function which are mapped to writes in heap.

S. The computer-readable storage medium as paragraph O recites, wherein the operations further comprise for each candidate function recorded in the candidate functions data structure, mapping one or more input argument(s) of the candidate function to one or more output return(s) of the candidate function.

T. The computer-readable storage medium as paragraph S recites, wherein the operations further comprise: counting frequency of each input argument(s)-output return(s) pair; and determining whether frequency of each input argument(s)-output return(s) pair exceeds a threshold.

U. The computer-readable storage medium as paragraph T recites, wherein the operations further comprise signaling a compiler regarding each candidate function whose corresponding input argument(s)-output return(s) pair exceeds a threshold or exceeds a particular rank.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    compiling target source code written in a programming language library to output target object code;
    performing instrumentation upon calls to memory allocation functions in the target source code; and
    mapping symbols causing heap access in the target object code to ranges of memory dynamically allocated for those symbols, wherein a mapping is operative to cause, during re-compilation of the target source code, replacing of a call to a symbol by a reference to a corresponding range of memory.

2. The method of claim 1, further comprising screening potentially pure functions of the target object code from non-pure functions thereof; and
    performing instrumentation upon each potentially pure function which has not been screened out.

3. The method of claim 1, further comprising acquiring values of input parameters of a target function prior to execution of the target function;
    acquiring values of output returns of the target function after execution of the target function;
    determining candidate functions for return value reuse; and
    adding each target function marked as a candidate for return value reuse to a candidate functions data structure.

4. The method of claim 1, further comprising acquiring memory addresses of each read from heap and write to heap performed within the instrumented code;
    looking up each written-to memory address in the data address correspondences;
    identifying each symbol in the data address correspondences mapping to a looked-up memory address; and
    adding each identified symbol, in the event that it is outside the scope of the target function, to a set of symbols outside the scope of the target function which are mapped to writes in heap.

5. The method of claim 3, further comprising for each candidate function recorded in the candidate functions data structure, mapping one or more input argument(s) of the candidate function to one or more output return(s) of the candidate function.

6. The method of claim 5, further comprising counting frequency of each input argument(s)-output return(s) pair; and
    determining whether frequency of each input argument(s)-output return(s) pair exceeds a threshold.

7. The method of claim 6, further comprising signaling a compiler regarding each candidate function whose corresponding input argument(s)-output return(s) pair exceeds a threshold or exceeds a particular rank.

8. A system comprising:
    one or more processors; and
    memory communicatively coupled to the one or more processors, the memory storing computer-executable modules executable by the one or more processors that, when executed by the one or more processors, perform associated operations, the computer-executable modules comprising:
        a compiler module configured to compile target source code written in a programming language library to output target object code; and
        an instrumenting module further comprising a data mapping submodule configured to:
            perform instrumentation upon calls to memory allocation functions in the target source code; and
            map symbols causing heap access in the target object code to ranges of memory dynamically allocated for those symbols, wherein a mapping is operative to configure the compiler module to, during re-compilation of the target source code, replace a call to a symbol by a reference to a corresponding range of memory.

9. The system of claim 8, wherein the data mapping submodule is further configured to:
    screen potentially pure functions of the target object code from non-pure functions thereof; and
    perform instrumentation upon each potentially pure function which has not been screened out.

10. The system of claim 8, wherein the instrumenting module further comprises a function wrapping submodule configured to:
    acquire values of input parameters of a target function prior to execution of the target function;
    acquire values of output returns of the target function after execution of the target function;
    determine candidate functions for return value reuse; and
    add each target function marked as a candidate for return value reuse to a candidate functions data structure.

11. The system of claim 8, wherein the instrumenting module further comprises an access monitoring submodule configured to:
acquire memory addresses of each read from heap and write to heap performed within the instrumented code;
look up each written-to memory address in the data address correspondences;
identify each symbol in the data address correspondences mapping to a looked-up memory address; and
add each identified symbol, in the event that it is outside the scope of the target function, to a set of symbols outside the scope of the target function which are mapped to writes in heap.

12. The system of claim 10, further comprising an optimizing module, the optimizing module further comprising a data locality submodule configured to, for each candidate function recorded in the candidate functions data structure, map one or more input argument(s) of the candidate function to one or more output return(s) of the candidate function.

13. The system of claim 12, wherein the optimizing module further comprises a reuse analyzing submodule configured to:
count frequency of each input argument(s)-output return(s) pair; and
determine whether frequency of each input argument(s)-output return(s) pair exceeds a threshold.

14. The system of claim 13, wherein the reuse analyzing submodule is further configured to signal a compiler regarding each candidate function whose corresponding input argument(s)-output return(s) pair exceeds a threshold or exceeds a particular rank.

15. A computer-readable storage medium storing computer-readable instructions executable by one or more processors, that when executed by the one or more processors, cause the one or more processors to perform operations comprising:
compiling target source code written in a programming language library to output target object code;
performing instrumentation upon calls to memory allocation functions in the target source code; and
mapping symbols causing heap access in the target object code to ranges of memory dynamically allocated for those symbols, wherein a mapping is operative to configure the one or more processors to, during re-compilation of the target source code, replace a call to a symbol by a reference to a corresponding range of memory.

16. The computer-readable storage medium of claim 15, wherein the operations further comprise:
screening potentially pure functions of the target object code from non-pure functions thereof; and
performing instrumentation upon each potentially pure function which has not been screened out.

17. The computer-readable storage medium of claim 15, wherein the operations further comprise:
acquiring values of input parameters of a target function prior to execution of the target function;
acquiring values of output returns of the target function after execution of the target function;
determining candidate functions for return value reuse; and
adding each target function marked as a candidate for return value reuse to a candidate functions data structure.

18. The computer-readable storage medium of claim 15, wherein the operations further comprise:
acquiring memory addresses of each read from heap and write to heap performed within the instrumented code;
looking up each written-to memory address in the data address correspondences;
identifying each symbol in the data address correspondences mapping to a looked-up memory address; and
adding each identified symbol, in the event that it is outside the scope of the target function, to a set of symbols outside the scope of the target function which are mapped to writes in heap.

19. The computer-readable storage medium of claim 17, wherein the operations further comprise for each candidate function recorded in the candidate functions data structure, mapping one or more input argument(s) of the candidate function to one or more output return(s) of the candidate function.

20. The computer-readable storage medium of claim 15, wherein the operations further comprise:
counting frequency of each input argument(s)-output return(s) pair;
determining whether frequency of each input argument(s)-output return(s) pair exceeds a threshold; and
signaling a compiler regarding each candidate function whose corresponding input argument(s)-output return(s) pair exceeds a threshold or exceeds a particular rank.

* * * * *